Dec. 8, 1931.  J. H. LONIE  1,834,956
HYDRAULIC FEED FOR WORKTABLES
Filed Dec. 31, 1927  2 Sheets-Sheet 1

Inventor
James H. Lonie
by H. Patterson Atty.

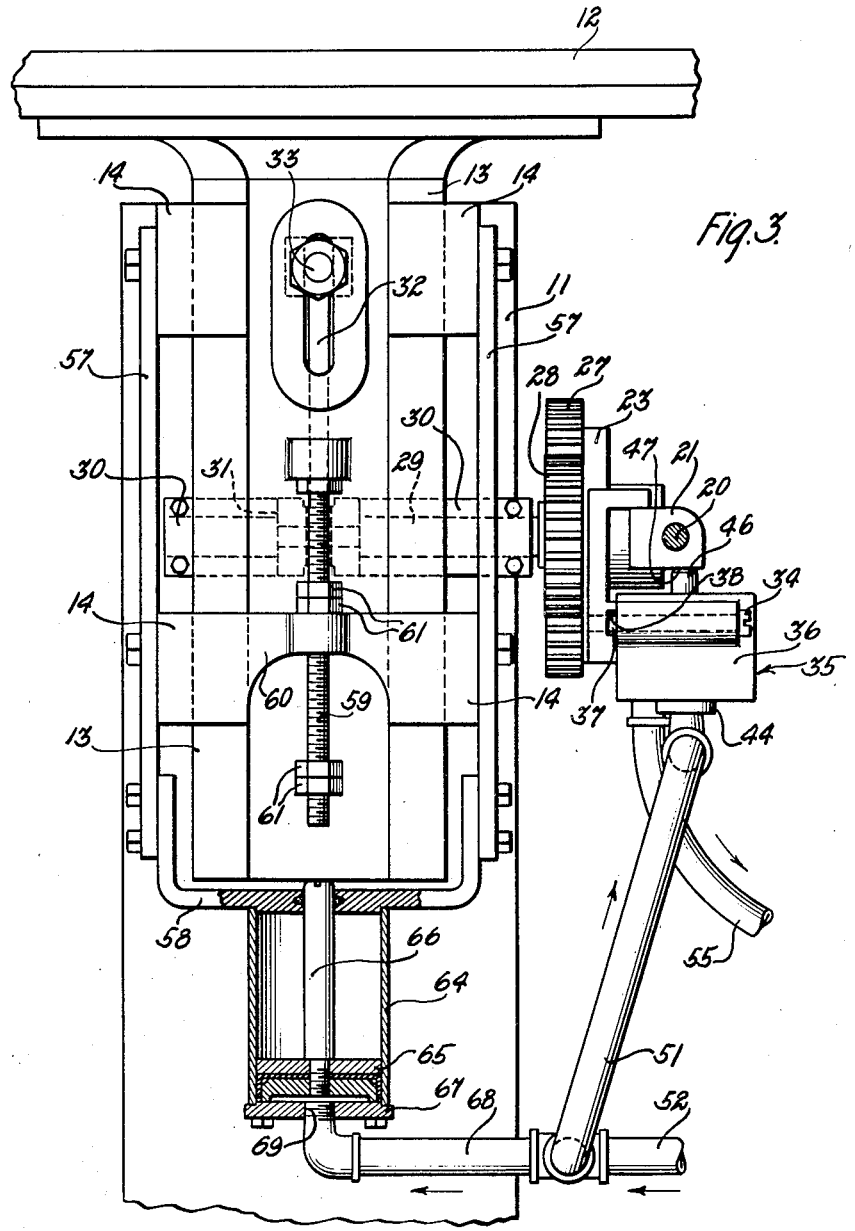

Patented Dec. 8, 1931

1,834,956

UNITED STATES PATENT OFFICE

JAMES HENRY LONIE, OF LA GRANGE, ILLINOIS, ASSIGNOR TO WESTERN ELECTRIC COMPANY, INCORPORATED, OF NEW YORK, N. Y., A CORPORATION OF NEW YORK

HYDRAULIC FEED FOR WORKTABLES

Application filed December 31, 1927. Serial No. 244,028.

This invention relates to control mechanisms, and more particularly to a manually controlled mechanism for controlling the effectiveness of an inelastic pressure medium upon a power responsive body.

The primary object of this invention is to provide a manually controlled mechanism for accurately and positively controlling the effectiveness of an inelastic pressure medium in accordance with the resistance encountered by a movable body.

In accordance with one embodiment of this invention as applied to a machine press equipped with a work table arranged to be raised manually by the usual hand lever, there is provided an inelastic pressure medium circulating system whose effectiveness may be varied to raise the table. The effectiveness of the inelastic pressure medium is controlled through the operation of the customary lever which when resistance to the movement of the table is encountered is operated with greater force, the effectiveness of the inelastic medium is likewise increased for supplying sufficient energy to overcome the resistance. Thus the operator is aided in raising the table, but its movement is always under the operator's control through the actuation of the lever, as the force of the pressure medium on the table is several times greater than the pressure applied to the lever.

Other objects and advantages of this invention will more fully appear from the following detailed description taken in connection with the accompanying drawings, wherein Fig. 1 is a fragmentary side view of a multiple spindle drill press with one embodiment of the control mechanism of this invention applied thereto for operating the work table thereof;

Fig. 3 is a front view of Fig. 2 looking toward the right thereof, and

Figure 1:
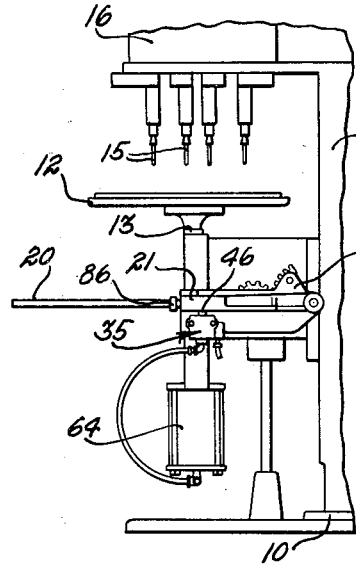

Referring now to the drawings in detail wherein like reference numerals indicate similar parts, particularly Fig. 1, which illustrates a multiple spindle drill press provided with one embodiment of the invention, a base 10 supports a vertical frame 11 upon which the entire mechanism of the multiple spindle drill press is mounted. A work table 12 is secured to an apron 13, the latter being slidable in ears 14 which are fixed to the frame 11 whereby whatever material is placed upon the table 12 may be brought into contact with drills 15 carried from a head 16. The drills 15 may be operated in any suitable manner, the details of which are not shown since they are not believed necessary to a complete understanding of this invention.

Figure 2:
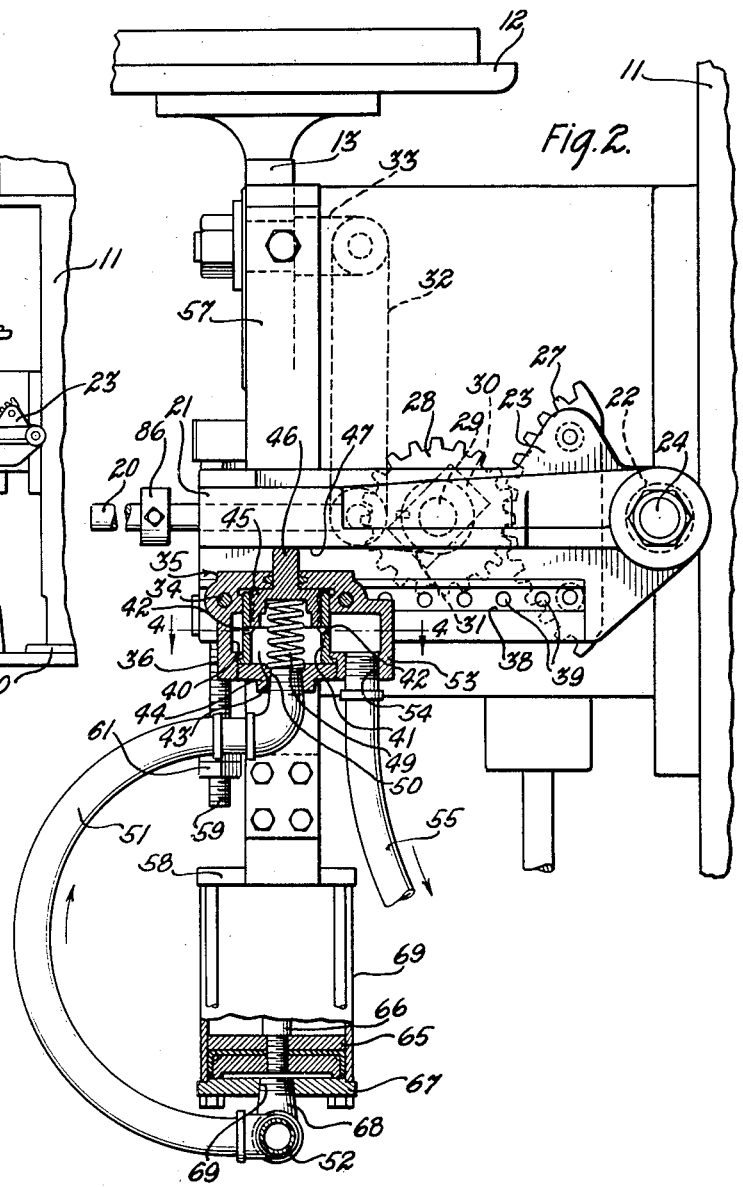
Fig. 2 is a fragmentary side view thereof, partly in section, on an enlarged scale.

The table 12, referring particularly to Fig. 2, is raised by the actuation of a usual gear and crank mechanism by the movement of a hand lever 20 fixed to a pivotal arm 21. The arm 21 is free to pivot upon a bearing boss 22, shown in dotted outline (Fig. 2), formed upon a rocking plate 23 in turn free to pivot on a stud shaft 24. Attached to the plate 23 is a gear segment 27 which meshes with a gear 28 keyed to a shaft 29 supported in spaced bearings 30 (Figs. 2 and 3). Keyed to the shaft 29 intermediate the bearings 30 is a lever 31 pivotally connected at its free end to the lower end of a link 32 shown in dotted outline in Figs. 2 and 3, the upper end of the link being pivotally connected to a pin 33 adjustably clamped to the apron 13. It will be apparent that upon depressing the hand lever 20 the gear segment 27 will be rocked counter-clockwise and the gear 28, the shaft 29 and attached lever 31 will be revolved clockwise, thereby causing the link 32, pin 33 and the attached apron 13 to move upwardly, thus the work table 12 will be raised.

Figure 4:
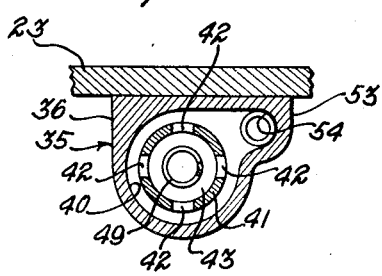
Fig. 4 is a plan section taken on the line 4—4 of Fig. 2.

Secured to the plate 23 below the arm 21 by screws 34 is a valve 35. Referring particularly to Figs. 2 and 4 the valve 35 comprises an outer supporting chambered casing 36. The casing 36 upon its rear or left side, as viewed in Fig. 3, is provided with a tongue 37 which has a sliding fit in a longitudinal groove 38 formed in the adjacent surface of the plate 23. A plurality of threaded apertures 39 are formed in the plate 23 along the groove 38 into which the screws 34 may be threaded so that the valve may be secured at any one of a plurality of selectable points, the purpose of which will be made apparent as this description progresses. Secured axially within a chamber 40 of the casing 36 is a bushing 41 provided with four uniformly spaced ports 42 which connect the chamber 40 with a main valve chamber 43 formed in the bushing 40. The lower end of the bushing 41 is equipped with an outwardly extending annular lip which is clamped against an inwardly extending annular lip formed in the casing 36 by a cap 44 screw threaded into an aperture in the lower end of the casing. Mounted in the chamber 43 of the bushing 41 is a cup-shaped valve piston 45 provided at its upper closed end with a stem 46 which extends through an aperture in the upper end of the casing 36 and into engagement with a flat horizontal surface 47 formed upon the underside of the arm 21, the arm resting by the action of gravity thereon. A compression spring 49 is mounted between the cap 44 and the piston 45 which serves in addition to the upward pressure of the medium on the under surface of the piston to maintain the stem 46 thereof against the arm 21 at all times. The tension of the spring 49 and the pressure of the medium is such that an initial depression of the lever 20 will not cause a relative movement between the piston 45 and the ports 42 to restrict the flow of the medium therethrough, the purpose of which will be set forth hereinafter, until the table 12 has actually been raised preliminarily by manual effort of the operator by the mechanism controlled by the movement of the lever 20 as hereinbefore described. The main valve chamber 43 is connected through an inlet port 50 in the cap 44 to the outlet port of a suitable inelastic pressure medium constant flow supply source (not shown) by an intermediate length of flexible transmission line 51 connected to a main supply line 52, while the chamber 40 of the casing 36 is provided with an offset portion 53 having an outlet port 54 which is connected to the inlet port of the supply source of a flexible transmission line 55. An inelastic pressure medium, such as oil, may be used with very good results.

Secured to the outer surfaces of the ears 14 upon which the apron 13 slides is a U-shaped strap 57 (Fig. 3), a lower horizontal arm 58 of which is positioned adjacent the lower surface of the apron when the latter is in its normal or lowered position. To the front surface of the apron 13 is secured a threaded rod 59 which freely extends through a bridge piece 60 extending between and integral with the lower pair of ears 14. Threaded onto the rod 59 at each side of the bridge piece 60 are nuts or stop collars 61, which it will be apparent may be adjusted to predeterminedly limit the movement of the apron 13 and consequently the table 12 either in an upward or downward direction. Fixed to the lower surface of the horizontal arm 58 of the strap 57 is an inelastic medium feed cylinder 64 provided with a piston 65, a stem or rod 66 thereof extending through the arm which serves as a head to close one end of the cylinder, the opposite end thereof being closed by a head 67. A closed line 68 connects the main transmission line 52 with the cylinder 64, an aperture 69 being provided in the lower head 67 for the entrance of the pressure medium within the cylinder and against the lower surface of the piston 65. In the normal position of the drill press the piston 65 is maintained in its lowered positon as shown in Fig. 3 by the weight of the table 12 and the apron 13, the lower end surface of the apron at all times engaging the upper end of the piston rod 66, in which position the upper stop collar 61 engages the bridge piece 60, no appreciable pressure occurring between the apron and the piston rod.

The operation of the drill press herein described embodying the control mechanism of this invention is as follows: With the parts in the position shown in the drawings, particularly Figs. 2 and 3, and with the main supply line 52 connected to a suitable means (not shown) for supplying a constant flow of inelastic pressure medium thereto, the medium flows from the line 52 through the line 51 in the direction indicated by the arrows, through the main valve chamber 43 returning through the open ports 42, the outer chamber 40, the port 54, to the return line 55 and back to the source of supply. This is the normal condition, the medium having a free escape through the open ports 42 but still maintaining an upward pressure against the lower surface of the cylinder piston 65 as will be readily apparent through the closed line 68 to the cylinder 64. Upon downward pressure being applied to the hand lever 20, the entire lever assembly which includes the arm 21 and the plate 23 function as a single lever, pivoting on the shaft 24 and through the segment 27 attached to the plate 23 and associated mechanism hereinbefore described causes the table 12 to be raised preliminarily until sufficient resistance is encountered to compress the spring 49. When this happens a continued downward movement of the lever 20 causes the piston 45 to move downwardly with respect to the open ports 42. This movement of the piston 45 reduces the size of the open ports 42 and creates an increased pressure in the line and consequently builds up a back pressure in the closed line 68 to the cylinder 64, thus the force of the medium is applied to the piston 65, which moves the apron 13 upwardly and the work table 12 is thereby elevated and the work drilled.

The manual effort required to raise the table 12 to complete the drilling operation is thus materially reduced, since only sufficient downward pressure is required on the hand lever 20 to preliminarily raise the table 12 to cause the work to engage the drills 15. The resistance to the upward movement of the table 12 and the consequent engagement of the drills with the work will immediately and positively be evident to the operator by the increased back pressure created in the line which acts to move the valve piston 45 upwardly against the pressure exerted by the operator on the hand lever 20. In the case of the first condition when the operator feels this upward thrust on the lever 20 from the valve piston 45 he increases his pressure downward on the lever in proportion to the upward pressure thereon, thus maintaining the reduced size of the ports and the upward movement of the table 12 continues. In case of the latter condition he merely releases the pressure on the lever 20 and raises it. An equilibrium exists between the forces acting on opposite sides of the piston 45 when the operator releases the pressure on the hand lever 20 so that the drill press and control mechanism will remain in the position to which they have been operated when the lever is released. To balance the forces an adjustable weight 86 is mounted on the hand lever 20. The raising of the hand lever 20 results in the ports 42 again being opened to their normal size, the pressure medium then circulating through the valve 35, thus the back pressure in the closed line 68 to the cylinder 64 is released and the weight of the press table 12 forces the medium from the cylinder into the lines 68 and 51 and through the valve, the operating parts of the drill press moving downwardly to their normal position as shown in Fig. 3. One of the principal advantages of this invention is that the operator can feel at all times the behavior of the drills 15 on the work. This is of great advantage, because when the normal progress of the drills is interfered with, or if the operator feels in his hand that the drills are through the work being drilled, he can immediately either further lower the hand lever 20 or release his pressure thereon and raise it in accordance with the condition encountered. The lower stop collars 61 are preferably adjusted on the rod 59 so that they engage the lower surface of the bridge 60 when the desired movement of the work carried by the table 12 relative to the drills 15 is accomplished. As hereinbefore described this condition is immediately indicated to the operator, who releases the hand lever 20 and raises it relative to the plate 23 and thus the ports 42 are opened to their normal size, the table 12 being lowered.

The ratio of the force applied by the operator to the hand lever 20 and the pressure of the medium on the feed cylinder piston 65 can be varied it will be apparent by changing the position of the valve 35 with respect to the axis of the arm 21. In the drawings the adjustment is such that a maximum hand pressure is required on the lever 20 to cause the table 12 to be elevated. To reduce this pressure the screws 34 are removed from the apertures 39 and the valve assembly 35 is moved along the groove 38 of the plate 23 and closer to the pivotal point of the arm 21, which is the shaft 24, and rebolted in position by threading the screws into another pair of apertures.

One of the outstanding advantages of the control mechanism hereinbefore described resides in its facile adaptability to commercial types of drill presses without making extensive alterations therein.

Although the invention has been disclosed and described as applied to a particular type of apparatus, it is clear that it may have a more general application and that modifications can be made without departing from the spirit and scope of the appended claims.

What is claimed is:

1. In a mechanism for controlling the operation of a machine press having a reciprocable work table, manually operable lever controlled means continually free to rotate about the same fixed point, gear mechanism connected thereto for causing a movement of the table, a fluid pressure medium circulating system, a cylinder connected thereto having a piston operatively associated with the work table for moving it, and a valve in the system through which the medium normally circulates, the valve having an operative connection with the lever and rendered effective and controlled in the movement thereof for creating a back pressure in the cylinder for causing the piston thereof to apply force in proportion to the manual force applied to the lever.

2. In a mechanism for controlling the operation of a machine press having a work table and mounting means for tools for performing work upon material on the table, manually operable lever controlled means continually free to pivot about a fixed point, gear mechanism connected thereto for causing a relative movement between the mounting means and the work table, a fluid pressure medium circulating system, a cylinder connected thereto having a piston for causing a similar movement, and a valve in the system rendered effective and controlled by a movement of the lever for controlling the flow of the medium to the cylinder for causing the piston thereof to apply force in proportion to the manual force applied to the lever.

In witness whereof, I hereunto subscribe my name this 23rd day of December, A. D. 1927.

JAMES HENRY LONIE.